Nov. 2, 1965     L. A. GRAEBER, JR., ETAL     3,215,315

BOOSTER SYSTEM FOR UNLOADING COMPRESSED GAS

Filed July 10, 1963

INVENTORS,
LEWIS A. GRAEBER, JR.
JAMES P. GRAEBER
BY
*Weatherford & Weatherford*
attys United States Patent Office 3,215,315
Patented Nov. 2, 1965

3,215,315
BOOSTER SYSTEM FOR UNLOADING
COMPRESSED GAS
Lewis A. Graeber, Jr., and James P. Graeber, both of
215 Pecan St., Marks, Miss.
Filed July 10, 1963, Ser. No. 294,043
4 Claims. (Cl. 222—146)

This invention relates to certain new and useful improvements in means for unloading compressed gas such as LP gas or other such gases from tank trucks and the like for delivery into stationary reservoirs, and is particularly concerned with providing a new and useful booster system for facilitating the delivery and operation of such unloading means.

As is well known, compressed gas is transported in tanks carried by trucks or other similar conveyances under pressure, maintaining the gas in its liquid state. It is discharged therefrom by pumping into a stationary reservoir, withdrawing the liquid gas from the lower portion of the truck tank and creating a void thereabove. Under the conditions of handling of this material it is found that in the latter stages of discharge from such a truck tank the pump becomes highly inefficient because of the at least partial vaporization of the remaining liquid contents into the void created thereabove. This results in an inefficiency in discharge from the pump, and also results in a tremendous vibration and wear problem in connection with the pump.

The present booster system contemplates a booster unit which is connected to the water system of the truck to receive water at engine heat from the engine of the truck, and into which is also delivered part of the gas being handled by the pump. The gas thus delivered into the booster is vaporized under the heat of the water system and is discharged into the upper portion of the truck tank, increasing the pressure above the level of the liquid gas and enhancing the operation of the discharge from the tank as desired to a stationary reservoir.

The principal object of the present invention is to provide a new and useful booster system for handling and discharging compressed gas.

A further object of the invention is to provide such a system which includes a booster utilizing water from the engine of a conveying truck in association with compressed gas such as LP gas bypassed from the discharge to create a supplemental pressure delivered to the upper portion of a tank on the truck, and thus to enhance the delivery of the gas.

A further object of the invention is to provide such a system in which the booster comprises twin coils closely intermeshed, one for receiving hot water from the truck engine, and the other for receiving LP gas to be vaporized and thence delivered to the tank above the liquid surface.

A further object of the invention is generally to improve means for delivering compressed gas from tank trucks to stationary reservoirs.

A further object of the invention is to provide a new and useful method of delivering compressed gas from a conveyance to a stationary reservoir.

The means by which the foregoing and other objects of the present invention are accomplished and the manner of their accomplishment will be readily understood from the following specification upon reference to the accompanying drawings, in which.

Figure 1:
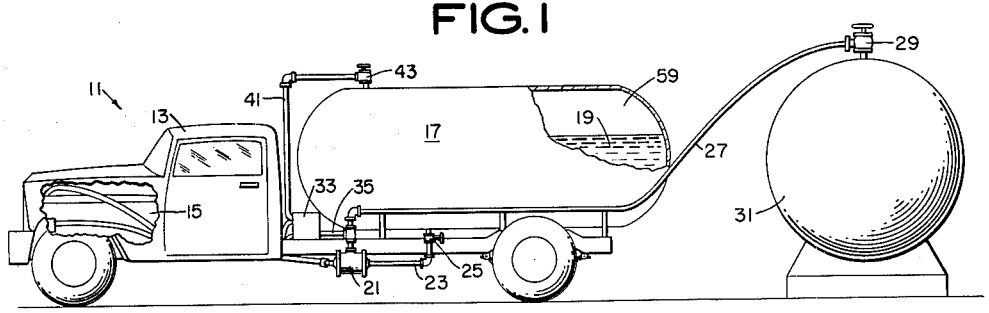
FIG. 1 is a side elevational view with parts broken away, and also partly diagrammatical, illustrating the present system.
Figure 2:
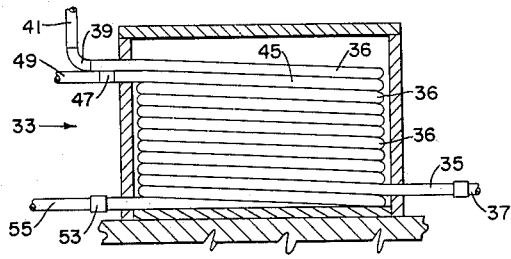
FIG. 2 is an enlarged fragmentary view illustrating the booster unit of the device.
Figure 3:
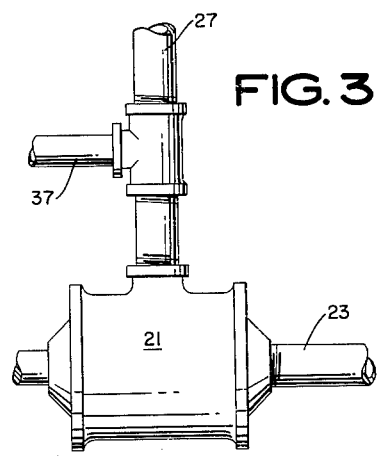
FIG. 3 is a similarly enlarged view showing the pump and its connections to the truck tank and to the by-pass for the booster system.
Figure 4:
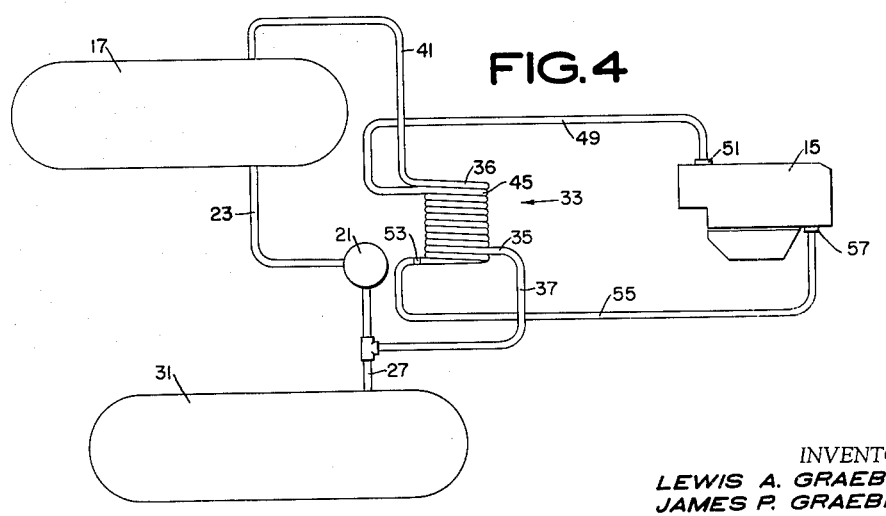
FIG. 4 is a diagrammatic view illustrating the arrangement of the device and the method of its use.

Referring now to the drawings in which the various parts are indicated by numerals, the present device is illustrated in connection with a tank truck 11 having a substantially conventional traction unit including a cab 13 and an engine 15. In the form of the device as here shown, the engine 15 is a conventional water cooled engine having a supply of cooling water circulated in conventional manner throughout its system.

Rearward of the cab 13, a pressure tank 17 is mounted on the truck bed and is carried thereby. Tank 17 is adapted to receive and retain in its liquid state a supply of liquid petroleum gas 19 commonly known as LP gas, or other compressed gases in liquid state. Beneath the tank a pump 21 driven from the power system of the truck 11 is mounted and is connected as through a line 23 to the contents of tank 17 for the purpose of withdrawing the contents therefrom. Line 23 connects to the interior of tank 17 as through a cutoff valve 25.

For discharging the gas withdrawn by the pump 21 from tank 17, the pump is connected to a discharge line 27 which may be detachably connected as at 29 to the inlet of a stationary reservoir 31. The hose 27, when disconnected from reservoir 31, may be conveniently stored alongside tank 17 of truck 11.

Mounted on truck 11 rearwardly of cab 13 is a booster unit 33. Booster unit 33 comprises a pair of twin coils of pipe which are spirally wound together so that the respective turns of the pipe of each coil overlies and is associated with the next adjacent turn of the other coil of the unit, thus producing a two-spiral hollow coil for the reception of the materials to effect boosting of the flow as desired herein.

To the lower entrant end 35 of one of the coils 36 of booster unit 33 a connection is made, as at 37, to discharge line 27 so that the coil may receive gas partially by-passed from the pump discharge along line 27. The upper end of coil 36 is connected as at 39 to a line 41 communicating at the upper portion of tank 17 as at 43.

The booster unit includes a heater water coil 45 disposed substantially concentrically and spirally with the turns of coil 36, and with the turns of coil 45 being interleaved or intermeshed between the turns of coil 45. To the upper end of coil 45, as at 47, a connection is made to a water line 49 which communicates from coil 45 to the engine block of engine 15, communicating thereinto as at 51 to receive hot water therefrom to circulate through coil 45. The lower end of coil 45 is connected as at 53 to one end of the water return line 55, which leads to and is connected with engine 15, as at 57.

With the device thus organized and arranged the tank 17 may be loaded with compressed gas for delivery to a suitable stationary reservoir 31. When the delivery connection is made to reservoir 31, as by connecting hose 27 as at 29 to the reservoir, pump 21 is activated by the operator to withdraw gas from tank 17 for purposes of discharge into hose 27. As pump 21 discharges into hose 27 it discharges through the T-connection, including connections 37, 39, so that a substantial portion of the gas withdrawn from the tank is bypassed to discharge into the gas coil 36 of the booster unit 33, with the remainder of the gas withdrawn traveling to the reservoir 31.

The gas thus discharging in liquid state into coil 36 travels upwardly through the coil toward discharge, as at 39, into line 41 for delivery into the upper portion of tank 17 above the level of gas 19 in the tank and into the void 59 therein. The coil 36 of booster unit 33 is intermingled and interleaved with the turns of companion hot water coil 45 of unit 33. Water coil 45, being connected with the water circulating system of truck engine 15, maintains a constant supply of hot water in its turns, and as the compressed gas is discharged into coil 36 at the lower entrant end to coil 36, the liquid gas is immediately subjected through the relationship of the coils and the intimacy thereof to the heat of the water in water coil 45, bringing the liquid gas from its liquid state into a vaporized form in order that it may be discharged as such vapor and under the increased pressure created by the vaporization into the upper void 59 of tank 17.

In this manner the bypassed gas passing through coil 36 is enabled to exert a boosting pressure upon the interior of tank 17 and the surface of gas 19 so as to assist the pump in its withdrawal from the lower portion of the tank and to maintain a pressure level above the level of the gas. Thus it will be seen that a portion of the liquid gas withdrawn by the pump for discharge toward a stationary reservoir is bypassed to go into a coil of a booster unit, which coil is intimately associated throughout its respective turns with a hot water coil connected with the water circulating system of a motor vehicle so as to vaporize the bypassed gas to create a pressure vapor for introduction into the truck tank to assist in creating the desired withdrawal from that tank. Additionally it will be seen that the bypassed discharge is through a small line relative to the main discharge line 27, and accordingly does not impede the discharge to the reservoir.

We claim:

1. In a system for delivering liquid compressed gas products from a carrier to a stationary reservoir, comprising a tank mounted for transportation on a vehicle and containing a supply of compressed gas, said vehicle including a source of hot liquid, a pump mounted adjacent said tank and connected to the lower part of the tank for withdrawal of tank contents, a discharge line leading from said pump to said reservoir for delivery of gas withdrawn from said tank in liquid state to said reservoir, a booster unit mounted on said vehicle adjacent said pump, said booster unit comprising a pair of intertwined spirally wound coils, each of said coils including a plurality of turns, the turns of one said coil being substantially parallel to and threadedly inter-engaged in contacting adjacent relationship with the turns of the other said coil, each of said coils comprising a hollow fluid conduit, said coils being disposed with their turns in spirally alternating superposed heat-exchange contacting relation, one said coil comprising a heater coil, the uppermost turn of said heater coil being connected to said source of hot liquid, the lowermost turn of said heater coil coupled to return said liquid to said source, the other said coil comprising a gas coil, the lowermost turn of said gas coil being connected to said discharge line and receiving bypass discharge of compressed gas in liquid state from said discharge line during operation of said pump, said bypassed liquid gas in said gas coil being vaporized by the heat of said heater coil and passing upwardly through said gas coil its uppermost turn, said uppermost turn of said gas coil being communicated with said tank above the level of the supply of compressed gas in said tank to inject bypass discharge and increase the pressure on said supply surface and assist withdrawal from said tank.

2. In a system for delivering compressed gas products from a carrier to a stationary reservoir, comprising a tank mounted for transportation on a vehicle and containing a supply of compressed gas, said vehicle including a source of hot liquid, a pump connected to the lower part of the tank for withdrawal of tank contents, a discharge line leading from said pump to said reservoir for delivery of gas withdrawn from said tank into said reservoir, a booster unit mounted on said vehicle adjacent said pump, said booster unit comprising a pair of intertwined spirally wound coils, each of said coils including a plurality of turns, the turns of one said coil being substantially parallel to and threadedly inter-engaged in contacting adjacent relationship with the turns of the other said coil, each of said coils comprising a hollow fluid conduit, said coils being disposed with their turns in spirally alternating superposed heat-exchange contacting relation, one said coil comprising a heater coil, said heater coil being connected to said source of hot liquid at one end, and coupled to return said liquid to said source, the other said coil comprising a gas coil, the lowermost turn of said gas coil being connected to said discharge line and receiving bypass discharge of compressed gas in liquid state from said discharge line during operation of said pump, said bypassed liquid gas in said gas coil being vaporized by the heat of said heater coil and passing upwardly through said gas coil to its uppermost turn, said uppermost turn of said gas coil being communicated with said tank above the level of the supply of compressed gas in said tank to inject bypass discharge and increase the pressure on said supply surface and assist withdrawal from said tank.

3. In a system for delivering liquid gas products from a carrier to a stationary reservoir, comprising a tank mounted for transportation on a vehicle and containing a supply of liquid gas, said vehicle including a source of hot liquid, a pump connected to the lower part of the tank for withdrawal of tank contents, a discharge line leading from said pump to said reservoir for delivery of liquid gas withdrawn from said tank in liquid state to said reservoir, a booster unit mounted on said vehicle adjacent said pump, said booster unit comprising a pair of intertwined spirally wound coil, each of said coils including a plurality of turns, the turns of one said coils being substantially parallel to and threadedly inter-engaged in contacting adjacent relationship with the turns of the other said coil, each of said coils comprising a hollow fluid conduit, said coils being disposed with their turns in spirally alternating superposed heat-exchange contacting relation, one said coil comprising a heater coil, said heater coil being connected to said source of hot liquid, the other said coil comprising a liquid gas coil, said gas coil being connected to said discharge line and receiving bypass discharge of liquid gas in liquid state from said discharge line during operation of said pump, said bypassed liquid gas in said gas coil being vaporized by the heat of said heater coil and passing through said gas coil, said gas coil being communicated with said tank above the level of the supply of liquid gas in said tank to inject bypass discharge and increase the pressure on said supply surface and assist withdrawal from said tank.

4. In a system for delivering liquid petroleum products from a carrier to a stationary reservoir, comprising a tank mounted for transportation on a vehicle and containing a supply of liquid petroleum gas, said vehicle including a source of hot liquid, a pump connected to the lower part of the tank for withdrawal of tank contents, a discharge line leading from said pump to said reservoir for delivery of liquid petroleum gas withdrawn from said tank in liquid state to said reservoir, a booster unit mounted on said vehicle in communication with said pump, said booster unit comprising a pair of spirally wound coils, each of said coils including a plurality of turns, the turns of one said coil being substantially parallel to and threadedly inter-engaged in adjacent relationship with the turns of the other said coil, in heat-exchange contact, each of said coils comprising a hollow fluid conduit, one said coil comprising a heater coil, said heater coil being connected to said source of hot liquid, the other said coil comprising a liquid gas coil, said gas coil being connected to said discharge line and receiving bypass discharge of liquid petroleum gas in liquid state from said discharge line during operation of said pump, said bypassed liquid gas in said gas coil being vaporized by the heat of said heater coil and passing through said gas coil, said gas coil being communicated with said tank above the level of the supply of liquid petroleum gas in said tank to inject bypass discharge and increase the pressure on said supply surface and assist withdrawal from said tank.

References Cited by the Examiner

UNITED STATES PATENTS

| | | | |
|---|---|---|---|
| 1,897,165 | 2/33 | Endacott et al. | 222—178 X |
| 1,897,167 | 2/33 | Thomas | 222—178 |
| 2,136,738 | 11/38 | Giordano | 222—146 X |
| 2,363,960 | 11/44 | Hansen | 62—53 X |
| 2,400,037 | 5/46 | Arndt et al. | 222—146 X |
| 2,530,521 | 11/50 | Hansen | 222—318 X |
| 2,919,834 | 1/60 | Rugeley et al. | 222—318 X |
| 3,127,752 | 4/64 | Smith | 62—52 |

RAPHAEL M. LUPO, *Primary Examiner.*